United States Patent
Gonzalez et al.

[11] Patent Number: 5,897,882
[45] Date of Patent: Apr. 27, 1999

[54] GLASS REPAIR SYSTEM

[76] Inventors: Juan Gonzalez, 1304 Ave. B, Abernathy, Tex. 79311; Howard W. Cargill, P.O. Box 984, Hale Center, Tex. 79041

[21] Appl. No.: 08/631,368

[22] Filed: Apr. 12, 1996

[51] Int. Cl.⁶ ........................................... B32B 35/00
[52] U.S. Cl. .............................. 425/12; 156/94; 156/382; 264/36; 264/102; 425/13
[58] Field of Search .................. 425/11, 12, 13; 264/36, 102; 156/94, 382; 251/315.01; 417/427

[56] References Cited

U.S. PATENT DOCUMENTS

| | | | |
|---|---|---|---|
| 2,373,628 | 4/1945 | Gleeson | 251/315.01 |
| 4,280,861 | 7/1981 | Schwartz | 156/382 |
| 4,568,061 | 2/1986 | Rabe | 251/315.01 |
| 4,725,204 | 2/1988 | Powell | 417/427 |
| 4,744,841 | 5/1988 | Thomas | 425/13 |
| 4,776,780 | 10/1988 | Banks | 425/12 |
| 4,820,148 | 4/1989 | Anderson | 425/12 |
| 4,826,413 | 5/1989 | Matles | 425/12 |
| 4,919,603 | 4/1990 | Herold et al. | 425/12 |
| 5,069,836 | 12/1991 | Werner et al. | 264/36 |
| 5,116,441 | 5/1992 | Campfield, Jr. | 425/13 |
| 5,122,042 | 6/1992 | Einiger | 425/12 |
| 5,234,325 | 8/1993 | Hill | 425/12 |
| 5,372,761 | 12/1994 | Anderson, Sr. | 264/36 |
| 5,589,018 | 12/1996 | Campfield | 425/13 |

*Primary Examiner*—Jay H. Woo
*Assistant Examiner*—Joseph Leyson
*Attorney, Agent, or Firm*—Royston, Rayzor, Vickery, Novak & Druce

[57] ABSTRACT

A system for repairing damaged glass including a vacuum powered anchor for securing the damage repair system to a surface of a damaged piece of glass proximate to a flaw in the glass surface. Included is an evacuating enclosure coupled to the anchor, the couplement providing a means by which the enclosure is fixable relative to the anchor. A common vacuum source is selectively communicatable with the anchor and the enclosure so that vacuum pressure may be selectively applied in any combination to the anchor and the enclosure. A resin applicator is also included for depositing resin into the flaw. Also included is a repair device for a cracked piece of glass. The repair device includes at least one anchor for securing the device to a surface of the flawed piece of glass opposite the crack opening. At least one depressor is coupled to the anchor for distending the piece of glass away from the repair device thereby expanding the crack opening at the glass surface opposite the depressor so that repair resin may be more readily deposited into the crack's interior.

13 Claims, 4 Drawing Sheets

GLASS REPAIR SYSTEM

FIELD OF THE INVENTION

This invention relates generally to an apparatus and system for repairing chips and cracks in glass. More specifically, but not by way of limitation, it is directed to an apparatus and method for repairing chips and cracks in windshields manufactured from safety glass.

BACKGROUND OF THE INVENTION

Shatterproof or safety glass is typically made of three layers: an outer glass layer, an internal synthetic resin or polymer layer which imports the shatterproof characteristics, and an inner glass layer. Although the glass is referred to as shatterproof, it readily forms conical chips when hit by a rapidly moving small object such as a pebble. The chip or break results in an air cavity in and potentially under the surface of the outer glass laminate. This initial chip can expand into a crack that extends across the glass if not promptly repaired.

The repair of chips and cracks on a piece of shatterproof glass typically is accomplished by injecting a glass repair resin into the air cavity of the damaged area. To help conceal the patch, the resin is selected to have a finished or hardened index of refraction that is close to that of the glass into which it is injected. The resin is allowed to dry and harden. Afterwards, the surface of the glass is leveled so that the surface presented is uniform across the patch. By repairing the glass, the more expensive cost of replacement is averted.

There exists many different devices and methods for repairing breaks in a windshield. U.S. Pat. No. 5,234,325 discloses an apparatus for repairing cracks along a windshield that includes positioning a cylinder over the crack in order to create a vacuum and pull air from the crack. With the vacuum in place, a side stem in communication with the cylinder allows resin to be introduced through the cylinder and into the crack. It should be noted, however, no vacuum pressure is made available for securing the apparatus to the glass. Likewise, U.S. Pat. No. 5,122,042 discloses an apparatus for repairing cracks in a windshield that includes utilizing air pressure to inject resin into a crack. The air pressure enables the resin to flow into the extended areas of the crack. Once again, no suction or vacuum is applied to the securing feet of the device.

U.S. Pat. No. 4,776,780 discloses an apparatus for repairing conical chips in a windshield that includes a diaphragm attached to the bottom of a housing. The diaphragm provides a first enclosure means in which the housing is able to attach to the windshield above the chip by means of a vacuum. Resin is introduced into the crack through a second enclosure by means of a plunger, with manipulation of the plunger alternatingly creating a vacuum and pressure in the enclosure to force the resin into the chip. The housing is removed from the glass once the resin is plunged in by rocking the housing to allow air into the first enclosure. U.S. Pat. No. 4,826,413 also discloses an apparatus for repairing chips on a windshield that includes a first vacuum cup for securing the apparatus to the windshield and a second smaller cup which is placed over the chip and through which resin is introduced. The smaller cup is in fluid connection with the larger cup such that by evacuating the larger cup, the smaller cup is simultaneously evacuated. There is no means by which the vacuum may be selectively applied to the two different components and the vacuum is produced by a mechanical pump, not manually.

Most of a windshield repair cost is attributable to labor, with supply costs being relatively low. By providing a windshield chip and crack repair kit affordably available to the average consumer, labor costs are eliminated allowing an individual to inexpensively fix a break in his or her windshield. Additionally, the system should be easy to use as well as portable, and preferably no external power source required since the locations for repair may often be remote.

SUMMARY OF THE INVENTION

This invention includes features and/or components that have been invented and selected for their individual and combined benefits and superior performance as a glass repair system; the invention also includes the novel method of using the same. The system includes multiple components that individually and singularly have new and novel features in and of themselves. Each of the individual components, however, work in association and are optimally mated to the others.

The present invention has been designed to provide an affordable means by which to repair both chips and cracks on a windshield. The invention is includes a chip repair device for repairing divots or voids in a windshield. There is also an optional lifting means for use in crack repair. An injector serves both devices in forcing resin into the break.

The chip repair device is further comprised of an anchor or securing means for mounting the repair device to the windshield at a location adjacent to the break. An enclosure is provided for attaining an airtight seal over the chip in the windshield. A single-chambered cylinder or evacuating means is removably attached to one of a plurality of vacuum lines on the device for evacuating air from both the enclosure and securing means. The cylinder is further comprised of a piston and piston head slidably disposed within the chamber of the piston. One or more valves are available in the lines enabling vacuum to be pulled in both the enclosure and securing means independent of one another. In at least one embodiment, the valves are preferably manually adjustable ball valves. A resin receiving chamber or reservoir is adjacent to the enclosure for providing resin for filling the break. In one embodiment, the reservoir is included within the body of the enclosure. Removably positionable within the receiving chamber is an injector or plunger for allowing resin to be added and potentially removed. During use, the plunger is reciprocated within the reservoir for depositing and working resin into the chip.

An accompanying crack repair device also includes one or more anchors that serve as mounting means or securing means for fastening the device to the windshield behind a crack. The repair device has as a component a jackscrew that is able to push upon an opposite surface behind the crack to separate and open the crack exposing its interior. In one embodiment, the above mentioned injector is fillable with resin that may later be ejected into the opened break. Alternatively, the injector may function as a resin applicator merely by dipping the distal end of the injector in resin and then dabbing the resin covered tip to the break.

The chip repair device may be used in combination with the crack repair device. This allows a vacuum to be pulled on the crack while it is simultaneously being opened by the distender to facilitate the deposit of resin into the interior of the break. By pulling a vacuum, any air bubbles that may be present in the resin will be drawn out resulting in a repaired crack that is less easily detected. The resin utilized in the repair process may be of any suitable formulation that has substantially the same index of refraction as that of the glass being repaired.

Referring now to specific embodiments of the glass repair system, additional benefits and advantageous features will be appreciated. In one embodiment, a system is provided for repairing damaged glass where the glass has a flaw in the form of a chip or crack. The repair system includes a vacuum powered anchor for securing the damage repair system to a surface of a damaged piece of glass proximate to a flaw in the surface. There is an evacuating enclosure coupled to the anchor, the couplement providing a means by which the enclosure is fixable relative to the anchor. A common vacuum source is selectively communicatable with the anchor and the enclosure so that vacuum pressure may be selectively applied in any combination to the anchor and the enclosure. A resin applicator is also included for depositing resin into the flaw.

In another embodiment of the present invention, a repair device for a damaged piece of glass is provided in which the glass has a flaw in the form of a crack that has an opening into an interior space of the crack at one side of the glass piece. The device includes at least one anchor for securing the repair device to a surface of the flawed piece of glass opposite the crack opening. At least one depressor is coupled to the anchor for distending the piece of glass away from the repair device thereby expanding the crack opening at the glass surface opposite the depressor so that repair resin may be more readily deposited into the crack's interior.

In still another embodiment, a method for repairing a crack in a piece of safety glass is disclosed. The method includes the steps of mounting a distender upon a surface of a piece of safety glass opposite a crack in the glass. The distender comprises a depressor for distending the glass away from the distender. In use, the depressor extends into engagement with the glass surface and exerts sufficient force on the glass surface to distend the glass away from the depressor. As a result, the glass surface adjacent to the depressor is slightly concave and the opposite surface at which the crack is exposed is convex so that the crack is opened at the glass surface opposite the depressor for receiving repair resin therein.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF DRAWINGS

The manner in which these objectives and other desirable characteristics can be obtained is explained in the following description and attached drawings in which.

DETAILED DESCRIPTION OF THE INVENTION

Figure 1:
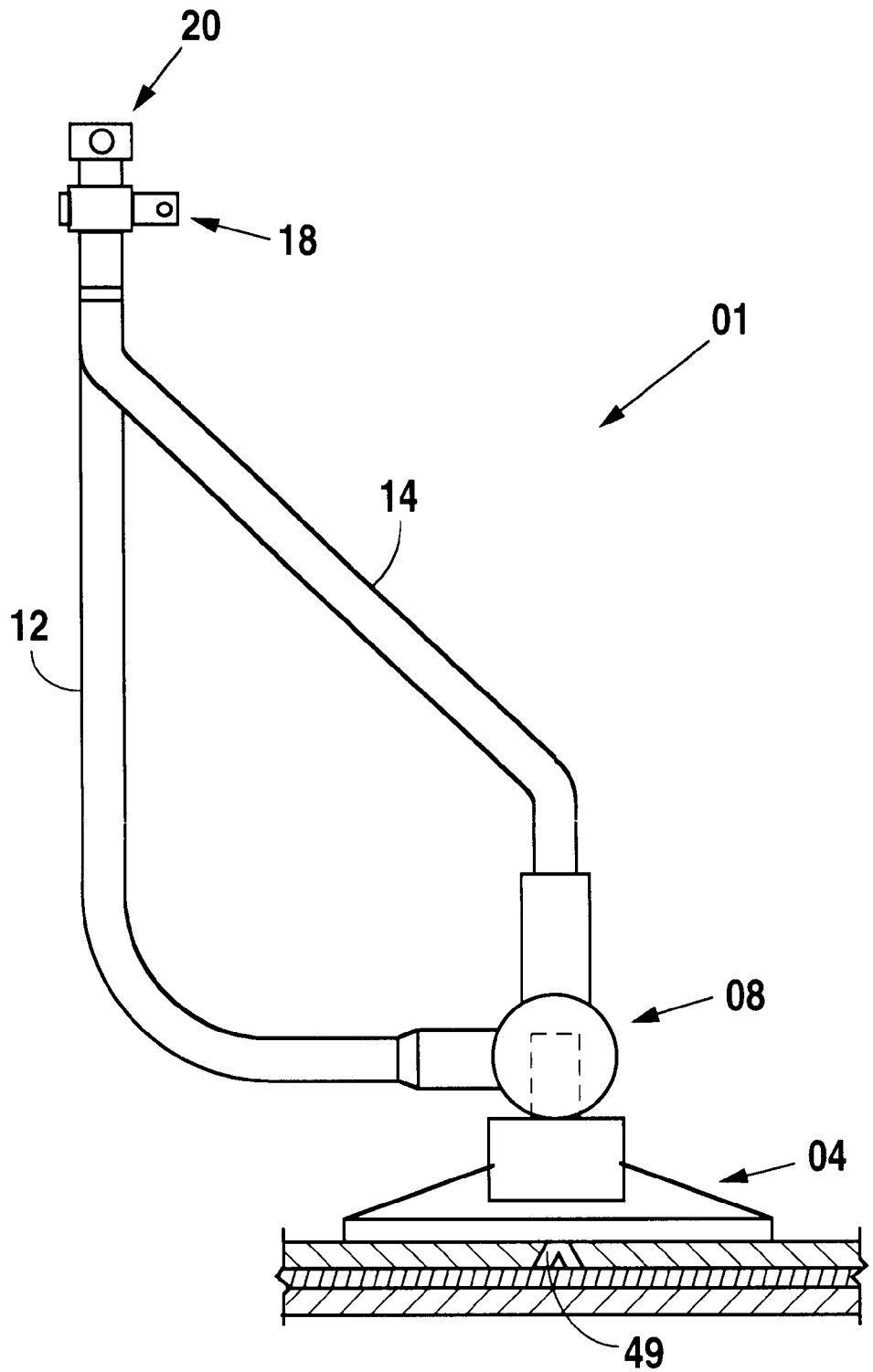
FIG. 1 illustrates a front view of the chip repair device as attached to a windshield.

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and will not be limiting. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, by not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

A method and apparatus for repairing voids in shatterproof or safety glass such as is found in windshields is described. In the following description, numerous specific details are set forth, such as suction cups, jackscrew, syringe, and plunger, etc., in order to provide a thorough understanding of the present invention. It will be obvious, however, to one skilled in the art that these specific details need not be used to practice the present invention. In other instances, well-known structures have not been shown in detail in order not to unnecessarily obscure the present invention.

Figure 2:
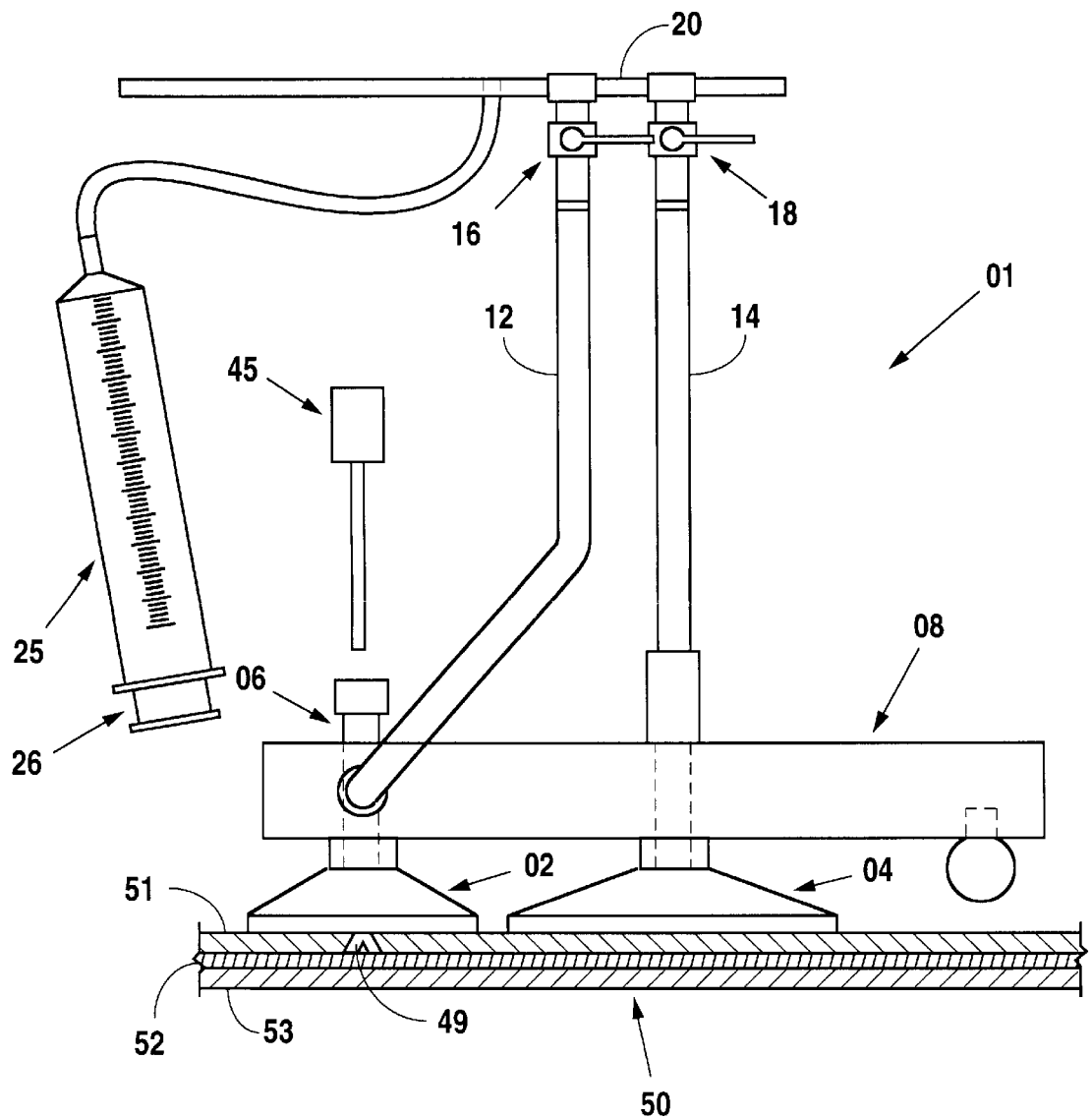
FIG. 2 illustrates a side view of the chip repair device in position above a chip on a windshield.
Figure 5:
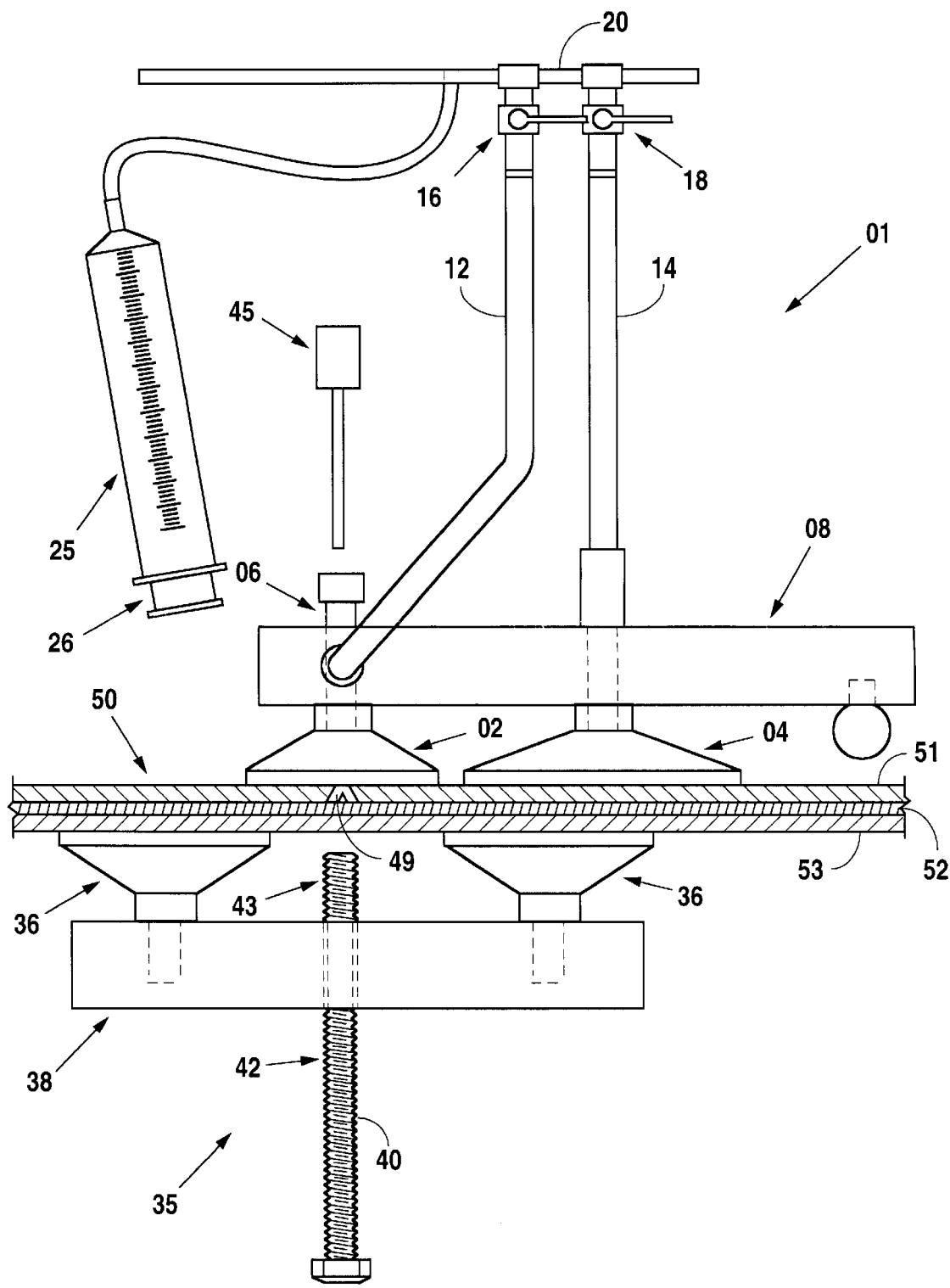
FIG. 5 shows a side view of the chip and crack repair devices illustrating a method of the devices working in tandem to repair a chip or crack on a windshield.

Referring to FIGS. 1, 2, and 5, the chip or glass repair apparatus of the instant invention is generally indicated by the reference numeral 01. It is comprised of an anchor or securing means 04 for attaching the device 01 to a windshield 50, an evacuating enclosure 02 that surrounds a void or chip 49, a couplement 08 for fixedly coupling the anchor 04 to the enclosure 02, a reservoir or glass resin receiving chamber 06 for receiving and holding resin that is to be used to fill the void, one or more vacuum lines 12 and 14, and one or more sealing means within the vacuum lines. In one embodiment, the perimeter of the enclosure 02 that comes in contact with the glass 50 may be substantially square in shape, while in another embodiment it may be substantially circular. In at least one embodiment, the enclosure 02, as well as the anchor 04 is a suction cup. Preferably, the anchor 04 and enclosure 02 are at least partially constructed from a flexible material having sealing qualities upon the glass 50.

A vacuum cylinder or syringe 25 with a plunger or piston 26 slidably received therein serves as an evacuating means for removing gases from the vacuum manifold defined by a distribution vacuum line 20 and its constituent conduit branches; those branches including the enclosure vacuum line 12 and the anchor vacuum line 14. Ultimately, and by way of the several conduits, the enclosure 02 and anchor 04 are evacuated by the vacuum pulled by the common vacuum source 25 and 26. The piston head (not shown) closely engages the interior side walls of the cylinder 25 forming an airtight seal. Withdrawal or retraction of the piston 26 within the cylinder 25 creates a vacuum within the several vacuum lines and the enclosure 02 and anchor 04 according to the orientation of an enclosure vacuum line sealing means 16 and an anchor vacuum line sealing means 18. The sealing means 16 and 18 can be ball valves manually rotatable between open and closed positions. An injector 45 is utilized to supply resin to the receiving chamber 06 and enclosure 02 for filling the chip 49 or crack 47 in the glass 50.

The windshield 50 typically is constructed from laminated glass that includes a first outer layer 51 of glass that is exterior to the vehicle, a second inner glass layer 53 that is interior to the vehicle, and a middle or sandwiched layer 52 that is a suitable safety material such as Monsanto's SAFLEX. Most typically, breaks in the exterior layer of glass 51 occur when small objects such as pebbles strike a windshield at a relatively high velocity. Usually, the outer layer 51 will break with the middle layer 52 protecting the inner layer 53 from breakage.

Figure 3:
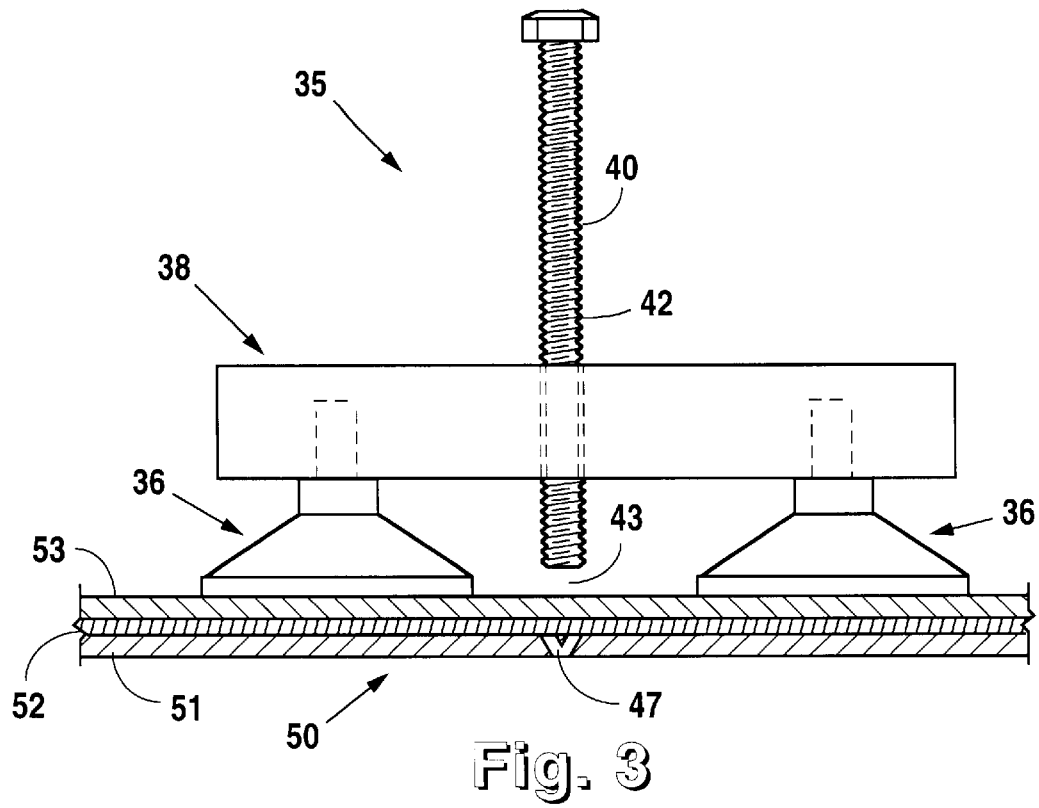
FIG. 3 illustrates a side view of the crack repair device in position above a crack on a windshield.
Figure 4:
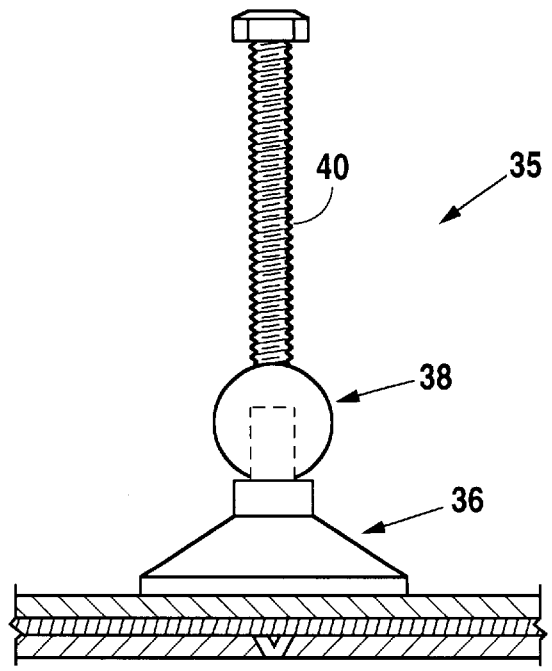
FIG. 4 illustrates a front view of the crack repair device as attached to a windshield.

The crack repair device 35, also referred to as a glass distender 35 is illustrated in FIGS. 3, 4 and 5 is comprised of at least one anchor or mounting means 36 for securing the device 35 to the inner glass layer 53 of the windshield 50. In the illustrated embodiment, two anchors 36 are employed for the securement of the crack repair device. The repair device also includes a depressor or jackscrew 40 and an extension arm or connecting shaft 38 for connecting the two anchors 36 together. The extension arm 38 also includes a threaded aperture for screwably receiving the threaded shaft of the jackscrew 40 centrally within the shaft 38. The shaft 42 of the jackscrew 40 is preferably constructed from plastic so that when the glass engaging head 43 contacts and presses upon the glass, no damage is inflicted.

The same resin injector 45 utilized in the chip repair device 01 may be utilized in the crack repair device 35 to apply resin to the break 47 in the glass 50. In this employment, resin is collected onto the tip or into the injector 45 and applied onto or injected into the crack 47.

The chip repair device 01 and crack repair device 35 of the instant invention is able to repair both chips 49 and cracks 47 of any length. At least three different methods of glass repair are available according to the present invention. In one method, with both ball valves 16,18 closed on the chip repair apparatus 01, and the cylinder 25 attached to the vacuum connecting line 20, a vacuum is created within the cylinder or syringe 25 and the connecting line 20 by partially retracting the plunger 26 within the cylinder 25. The chip repair device 01 is positioned on a windshield 50 through the securing means 04 in near proximity to the chip 49 to be repaired with the enclosure 02 substantially centered above the chip 49, as shown in FIGS. 1 and 2. Initially, both sealing means or valves 16,18 are closed. The anchor suction cup 04 independently adheres to the glass 50 when the anchor vacuum line sealing means 18 is closed and the anchor suction cup 04 is pressed against the glass 50. The enclosure suction cup 02 also independently adheres to the glass 50 when the enclosure vacuum line sealing means 16 is closed and the enclosure suction cup 02 is pressed against the glass 50. Also, the injector 45 is separate from the device 01 leaving the enclosure 02 open to atmospheric pressure and able to be positioned over the chip 49 without adhering to the windshield 50.

The vacuum created by placing the securing means or second cup 04 on the windshield 50 is strengthened by opening the second valve 18 and distributing the vacuum from the cylinder 25 to the cup 04 thereby resulting in a greater seal of the device 01 to the windshield 50. With the vacuum from the cylinder 25 distributed to the second cup 04, the second valve 18 is closed thereby sealing the vacuum on the line 14 and the cup 04. Any air remaining in the cylinder 25 is removed by opening first valve 16 and pushing plunger 26 substantially into cylinder 25. With the air removed from the cylinder 25, the valve 16 is closed and a vacuum is again created within the cylinder 25 and the vacuum connecting line 20 by partially withdrawing the plunger 26 within the cylinder 25.

Resin is added through the reservoir or resin receiving chamber 06 for filling the chip 49. Enough resin is added to fill the chip 49, but not fill both the interior of the enclosure 02 and the chamber 06 above where the first vacuum line 12 joins to the receiving chamber 06. The injector 45 is dimensioned to fit tightly within the chamber 06 so that a vacuum may be maintained within the enclosure when the injector 45 is inserted into the chamber 06. The injector 45 is inserted into the chamber 06 above the junction of the vacuum line 12 and chamber 06, and the first valve 16 is opened to distribute the vacuum from the cylinder 25 to the enclosure 02. This vacuum draws air out from the chip 49 through the resin and into the receiving chamber 06 and vacuum line 12. With the air removed from the chip 49, the injector 45 may be inserted further into the chamber 06 closing off the vacuum and creating pressure to force the resin into the chip 49 on the windshield 50.

Once the resin has filled the void 49 in the windshield 50, the device 01 is quickly removed by opening first sealing means 16 thereby releasing the vacuum on the enclosure 02. Cylinder 25 is able to be removed from vacuum connecting line 20 to ensure that the vacuum is released. Second sealing means 18 is opened releasing the vacuum on second vacuum line 14 and securing means 04 thereby allowing device 01 to be lifted off of the windshield 50. The repaired area can then be covered with a patch, preferably mylar, and allowed to cure in sunlight or by similar means. After curing, any excess resin can be removed by means such as a razor blade.

In the second method of repair illustrated in FIGS. 3 and 4, the crack repair device 35 of the present invention is utilized with the injector 45 for repairing cracks running across a windshield 50. With the connecting shaft 38 positioned across the crack 47 such that the mounting means 36 are substantially equidistant on opposite sides of the crack 47 and the jackscrew 40 substantially under the crack 47, the repair device 35 is secured to the inner layer 53 of the windshield 50.

Once secured to the windshield 50, the jackscrew 40 is screwed downwardly onto the inner glass layer 53 at the crack 47 so that the outer glass layer 51 is pushed upwardly and outwardly thereby opening or widening the crack 47. In this manner the interior surface of the glass is more concave, while the exterior of the glass is more convex. With the crack 47 opened up, resin is applied or injected into the crack 47 by means of the injector 45. After applying the resin, the jackscrew 40 is removed off of the glass 50 thereby releasing pressure on the glass 50 and allowing the separated pieces of outer glass 51 to rejoin filled with resin. The action of the separated layers 51 joining back together aids in removing air out of the resin. This process of lifting, separating, filling and rejoining is repeated across the length of the crack by progressively positioning the crack repair device 35 under those portions of the crack 47 not filled with resin until substantially all of the crack 47 is filled with resin. As with repair of chips 49, the repaired crack 47 can be covered with a patch and allowed to cure.

In a third method of repair illustrated in FIG. 5, both the chip repair device 01 and crack repair device 35 are used together to repair a crack 47 on a windshield 50. The same general process as described above in methods one and two are followed, with the chip repair device's 01 enclosure 02 positioned substantially above the jackscrew 40 on the outer layer 51 of the glass 50. The benefit of using both devices jointly is that most, if not all, of the air is removed from the resin by means of the vacuum created in the enclosure 02.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

A glass repair system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A system for repairing damaged glass where the glass has a flaw in the form of a chip or crack, said repair system comprising:

a vacuum powered anchor for securing said damage repair system to a surface of a damaged piece of glass proximate to a flaw in said surface;

an evacuating enclosure fixedly coupled to said anchor;

a common vacuum source selectively communicatable with said anchor and said enclosure so that vacuum pressure is selectively applied in any combination to said anchor and said enclosure; and a resin applicator communicatable with said enclosure for depositing resin into the flaw.

2. The repair system as recited in claim 1; further comprising:

said common vacuum source being fluidly communicated with said vacuum powered anchor and said evacuating enclosure by a vacuum manifold, said manifold having independent conduit branches to said vacuum powered anchor and said evacuating enclosure.

3. The repair system as recited in claim 2; wherein said manifold further comprises:

a distribution vacuum line connected between said vacuum source and said independent conduit branches, said branches comprising an enclosure vacuum line and an anchor vacuum line for permitting fluid communication between said vacuum source and said anchor and said enclosure.

4. The repair system as recited in claim 3; wherein said common vacuum source further comprises:

a manually operable cylinder and reciprocating piston slidably engageable within said cylinder; and said cylinder is adapted to be fluidly coupled to said vacuum manifold so that when said piston is retracted within said cylinder, vacuum pressure is applied to said distribution vacuum line.

5. The repair system as recited in claim 3; further comprising:

an enclosure vacuum line sealing means positioned along said enclosure vacuum line, said enclosure vacuum line sealing means having an open position in which fluid is permitted to pass said enclosure vacuum line sealing means and a closed position in which fluid is prevented from passing said enclosure vacuum line sealing means; and an anchor vacuum line sealing means positioned along said anchor vacuum line, said anchor vacuum line sealing means having an open position in which fluid is permitted to pass said anchor vacuum line sealing means and a closed position in which fluid is prevented from passing said anchor vacuum line sealing means; and each of said sealing means being independently and operator selectably orientable between the open and closed positions so that each of said anchor and said enclosure is exclusively placable into fluid communication with said common vacuum source.

6. The repair system as recited in claim 5; wherein each of said sealing means comprises a valve that is manually operable between the open and closed positions.

7. The repair system as recited in claim 6; wherein each of said valves is a ball valve manually rotatable between the open and closed positions.

8. The repair system as recited in claim 5; wherein said anchor further comprises:

an anchor suction cup that independently adheres to said glass surface when said anchor vacuum line sealing means is closed and said anchor suction cup is pressed against said glass surface.

9. The repair system as recited in claim 5; wherein said evacuating enclosure further comprises:

an enclosure suction cup that independently adheres to said glass surface when said enclosure vacuum line sealing means is closed and said enclosure suction cup is pressed against said glass surface.

10. The repair system as recited in claim 1; further comprising:

a distender for a damaged piece of glass having a flaw in the form of a crack that has an opening into an interior space of the crack at one side of the glass piece, said distender comprising:

a first anchor suction cup for securing said distender to a surface of the flawed piece of glass opposite the crack opening; and at least one depressor coupled to said anchor for distending the piece of glass away from said distender thereby expanding the crack opening at the glass surface opposite the depressor so that repair resin is more readily deposited into the crack's interior.

11. The repair system as recited in claim 10, further comprising:

a second anchor suction cup coupled to said first anchor suction cup by an extension arm with said depressor coupled to said arm for motion relative thereto so that reactionary forces exerted on said depressor away from the glass surface to which said distender is mounted are resisted by both said anchor suction cups.

12. The repair system as recited in claim 11, wherein said depressor further comprises:

a jackscrew having a shaft threadedly connected to said extension arm for continuous rotatable travel along a threaded portion of said shaft resulting in extension and retraction of a glass engaging head of said shaft relative to said arm.

13. The repair system as recited in claim 12, wherein said depressor is constructed from a plastic to assure that engagement of said shaft head with the glass surface does not damage the glass.

* * * * *